(12) United States Patent
Sakai et al.

(10) Patent No.: US 10,523,846 B2
(45) Date of Patent: Dec. 31, 2019

(54) PERFORMING COLOR CORRECTION OF IMAGE DATA WHERE SELECTION INFORMATION IS INDICATING THAT COLOR CORRECTION IS NOT TO BE PERFORMED

(71) Applicant: FUJI XEROX CO., LTD., Tokyo (JP)

(72) Inventors: Noriko Sakai, Kanagawa (JP); Makoto Fujio, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 15/497,447

(22) Filed: Apr. 26, 2017

(65) Prior Publication Data

US 2018/0124284 A1 May 3, 2018

(30) Foreign Application Priority Data

Oct. 27, 2016 (JP) ................................ 2016-211116

(51) Int. Cl.
*H04N 1/60* (2006.01)
(52) U.S. Cl.
CPC ................... *H04N 1/6011* (2013.01)
(58) Field of Classification Search
CPC .... H04N 1/6011; H04N 1/6088; H04N 1/603; H04N 1/6052
See application file for complete search history.

(56) References Cited

U.S. PATENT DOCUMENTS 6,198,553 B1 * 3/2001 Yamamoto ........... H04N 1/6011
358/519
6,320,980 B1 * 11/2001 Hidaka ................ H04N 1/6011
358/518

FOREIGN PATENT DOCUMENTS

JP 8-292735 A 11/1996
JP 2010-81327 A 4/2010

* cited by examiner

*Primary Examiner* — Christopher Wait
(74) *Attorney, Agent, or Firm* — Sughrue Mion, PLLC

(57) ABSTRACT

An image processing device includes: a conversion relationship acquisition unit that acquires, for each of plural output destinations by which to output an image, a conversion relationship for performing color correction corresponding to each of the output destinations; a selection information acquisition unit that acquires, for each of the plural output destinations, selection information about whether or not to perform color correction using the conversion relationship; and an image data transmission unit that transmits, to a display device, image data expressing the image before or after performing color correction on a basis of the selection information acquired from the selection information acquisition unit.

13 Claims, 13 Drawing Sheets

FIG. 9

| No. | DISPLAY DEVICE | IMAGE FORMING DEVICE | LIGHTING ENVIRONMENT | LEVEL |
|---|---|---|---|---|
| 1 | ON | ON | ON | 5 |
| 2 | ON | ON | OFF | 4 |
| 3 | ON | OFF | OFF | 3 |
| 4 | OFF | ON | ON | 2 |
| 5 | OFF | OFF | OFF | 1 |

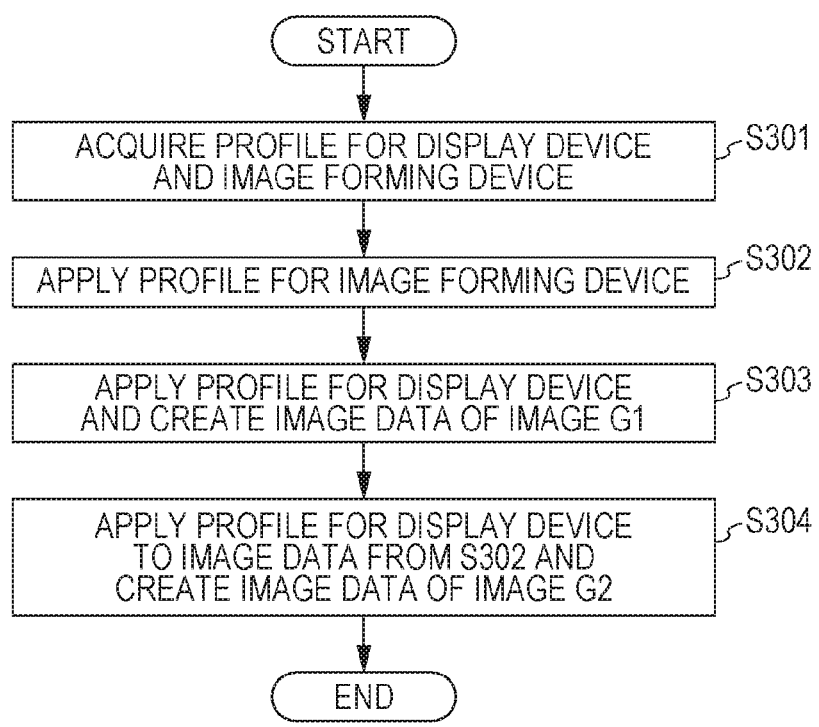

PERFORMING COLOR CORRECTION OF IMAGE DATA WHERE SELECTION INFORMATION IS INDICATING THAT COLOR CORRECTION IS NOT TO BE PERFORMED

CROSS-REFERENCE TO RELATED APPLICATIONS

This application is based on and claims priority under 35 USC 119 from Japanese Patent Application No. 2016-211116 filed Oct. 27, 2016.

BACKGROUND

Technical Field

The present invention relates to an image processing device, a display device, and a non-transitory computer-readable medium.

SUMMARY

According to an aspect of the invention, there is provided an image processing device including: a conversion relationship acquisition unit that acquires, for each of plural output destinations by which to output an image, a conversion relationship for performing color correction corresponding to each of the output destinations; a selection information acquisition unit that acquires, for each of the plural output destinations, selection information about whether or not to perform color correction using the conversion relationship; and an image data transmission unit that transmits, to a display device, image data expressing the image before or after performing color correction on a basis of the selection information acquired from the selection information acquisition unit.

BRIEF DESCRIPTION OF THE DRAWINGS

An exemplary embodiment of the present invention will be described in detail based on the following figures, wherein:

FIG. 9 is a diagram illustrating an example of combinations of selection information; and FIGS. 10A to 10E are flowcharts describing a method of creating image data for each of the cases from No. 1 to No. 5 in FIG. 9, respectively.

DETAILED DESCRIPTION

Hereinafter, an exemplary embodiment of the invention will be described in detail and with reference to the attached drawings.

<Description of Overall Image Processing System>

Figure 1:
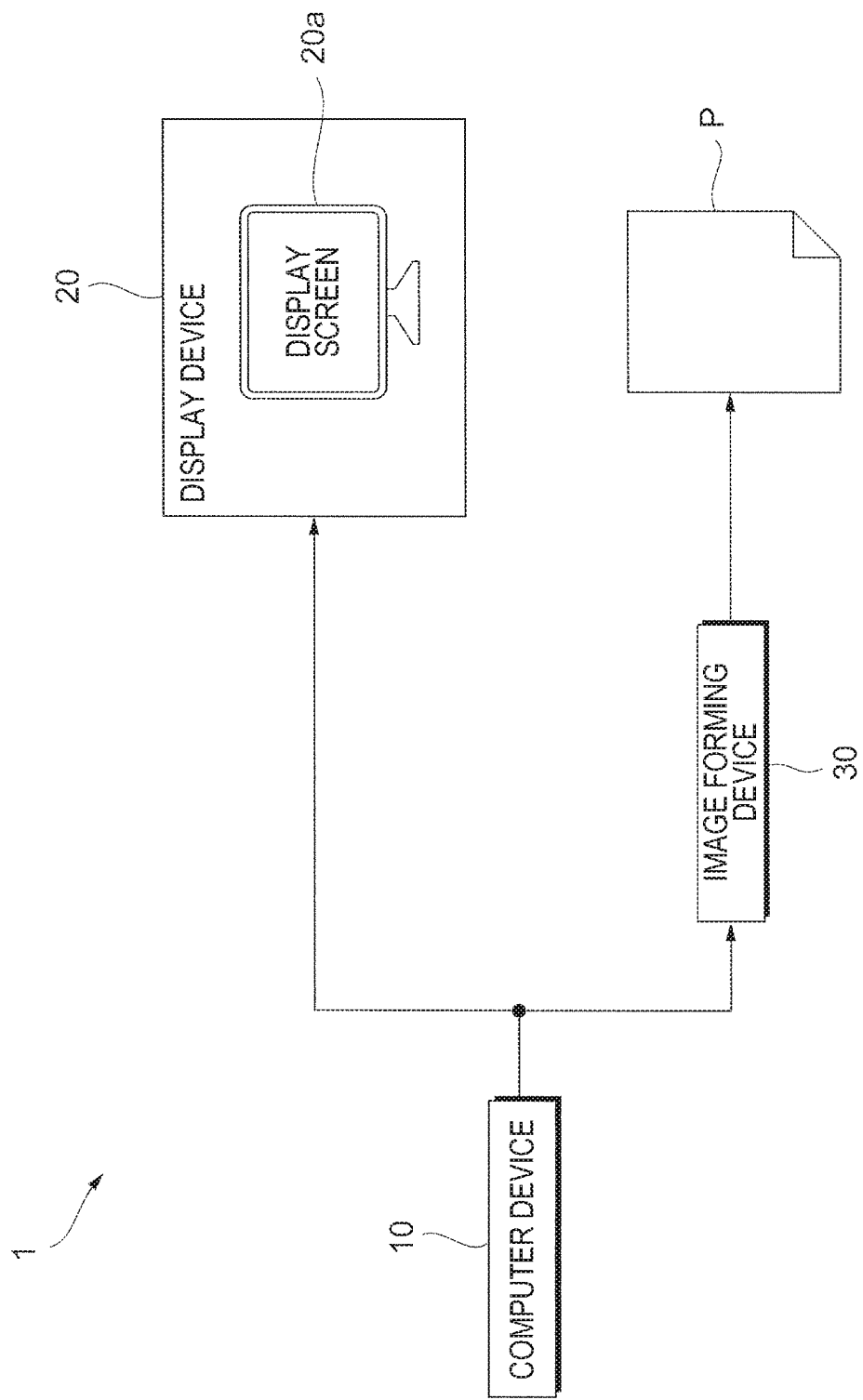
FIG. 1 is a diagram illustrating an example of a configuration of an image processing system applying an exemplary embodiment.

FIG. 1 is a diagram illustrating an example of a configuration of an image processing system 1 applying an exemplary embodiment. The image processing system 1 is provided with a computer device 10 that conducts processes such as the creation of image data (image information), a display device 20 that displays an image on the basis of the image data, and an image forming device 30 that forms an image on a recording medium P on the basis of the image data.

In the image processing system 1, the computer device 10 and the display device 20 are connected via Digital Visual Interface (DVI), for example. Note that instead of DVI, a connection may also be made via High-Definition Multimedia Interface (HDMI) or DisplayPort. Also, the computer device 10 and the image forming device 30 are connected by a local area network (LAN), for example.

The computer device 10 is an example of an image processing device, and is a general-purpose personal computer (PC). Additionally, the computer device 10 is configured to conduct processes such as the creation of image data by running various types of application software under management by an operating system (OS). Note that the computer device 10 may be provided with devices such as a keyboard device and a mouse device (not illustrated), for example, as input devices.

Figure 2:
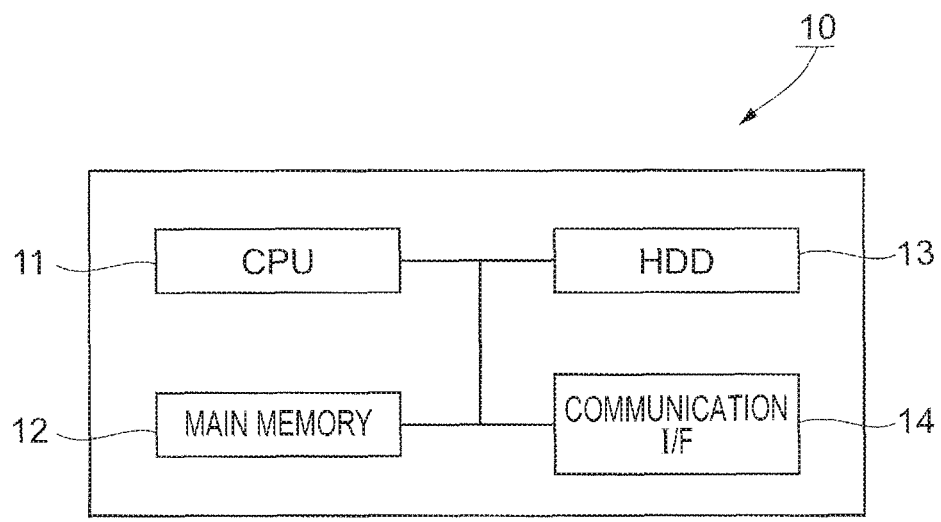
FIG. 2 is a diagram illustrating a hardware configuration of a computer device.

FIG. 2 is a diagram illustrating a hardware configuration of the computer device 10. The computer device 10 is realized by a personal computer or the like as discussed earlier. Furthermore, as illustrated in the drawing, the computer device 10 is equipped with a central processing unit (CPU) 11 that acts as a computational component, as well as main memory 12 and a hard disk drive (HDD) 13 that act as storage components. Herein, the CPU 11 executes various programs, such as an operating system (OS) and application software. Also, the main memory 12 is a storage area that stores information such as various programs and data used in the execution of such programs, while the HDD 13 is a storage area that stores information such as input data for various programs and output data from various programs. Furthermore, the computer device 10 is equipped with a communication interface (hereinafter designated the "communication I/F") 14 for communicating with external devices, including the display device 20 and the image forming device 30.

The display device 20 displays an image on the basis of image data created by the computer device 10. The display device 20 is made up of a device equipped with a function of displaying images by additive color mixing, such as a liquid crystal display for a PC, a liquid crystal TV, or a projector, for example. Consequently, the display method by the display device 20 is not limited to a liquid crystal method. Herein, in the present exemplary embodiment, the display device 20 is taken to display an image by using the three colors of red (R), green (G), and blue (B). Note that since the case of using a liquid crystal display for a PC as the display device 20 is given as an example, FIG. 1 illustrates the display screen 20a being provided inside the display device 20, but in the case of using a projector as the display device 20, for example, the display screen 20a becomes a screen or the like provided externally to the display device 20.

Figure 3:
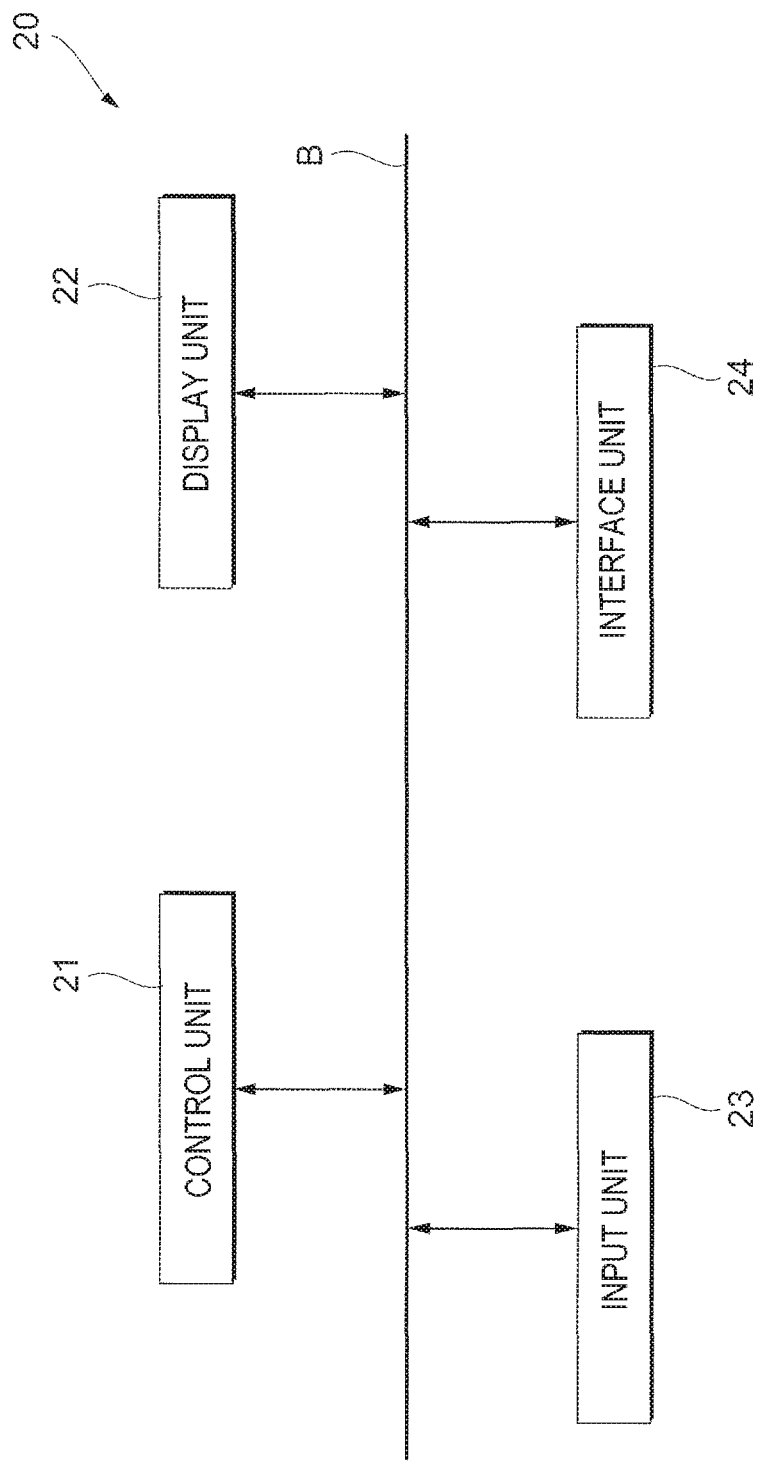
FIG. 3 is a diagram illustrating a hardware configuration of a display device.

FIG. 3 illustrates a hardware configuration of the display device 20. The display device 20 is equipped with a control unit 21, a display unit 22, an input unit 23, and an interface unit 24. Additionally, these units exchange data via a bus B.

The control unit 21 is made of components such as a CPU, random access memory (RAM), and read-only memory (ROM), and controls the image to be displayed by the display device 20. The display unit 22 includes a display screen 20a, which may be a liquid crystal panel, an organic EL panel, a cathode ray tube, or the like having a function of displaying images. The input unit 23 is provided to enable the user to input various instructions, such as for image adjustment, into the display device 20. The input unit 23 may be a menu button, directional keys, and the like, for example. The interface unit 24 is provided to connect to the computer device 10, and conforms to a standard such as DVI discussed above, for example. The interface unit 24 is an example of an image data acquisition unit that acquires the image data of an image which is created by the computer device 10 and which is to be displayed on the display screen 20a.

The image forming device 30 forms an image on a recording medium P such as a sheet of paper on the basis of image data, and outputs the result as a printed medium. The image forming device 30 is provided with a printer function, but additionally may be provided with other image processing functions, such as a scanner function and a facsimile function, for example.

Figure 4:
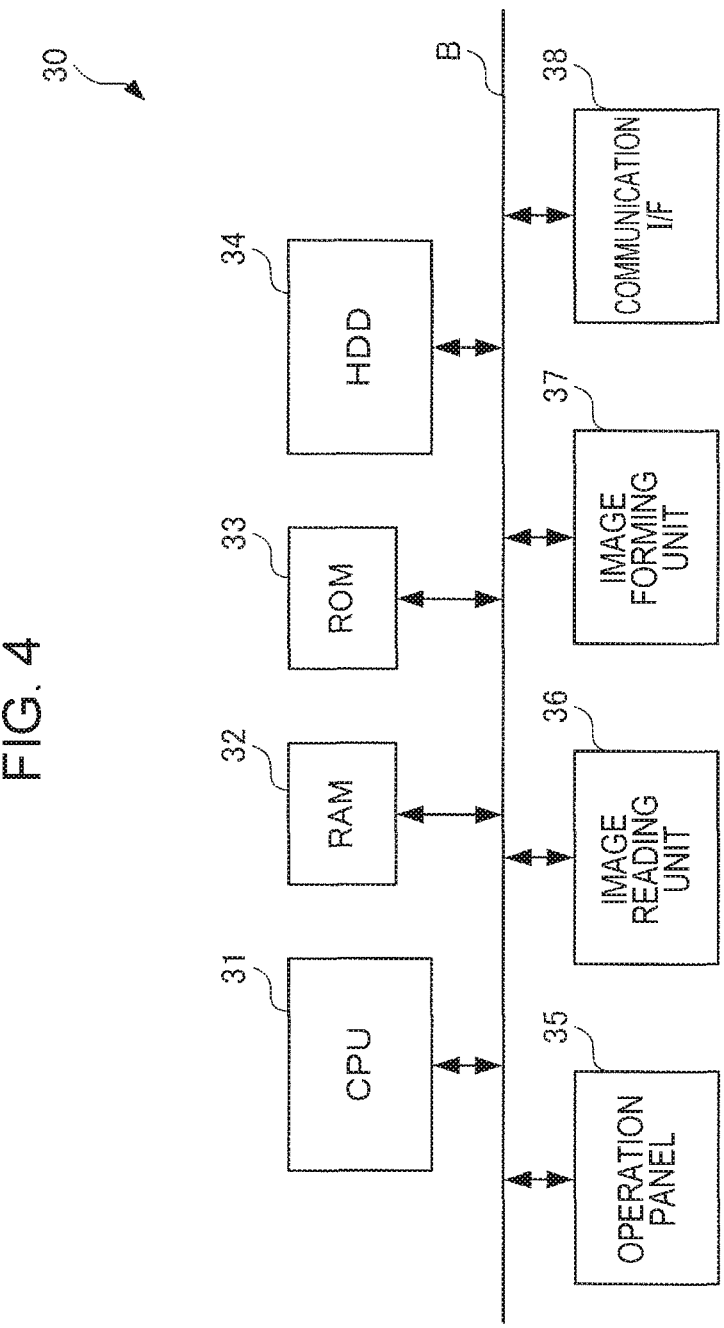
FIG. 4 is a diagram illustrating an exemplary hardware configuration of an image forming device.

FIG. 4 is a diagram illustrating an exemplary hardware configuration of the image forming device 30. As illustrated in the drawing, the image forming device 30 is equipped with a CPU 31, RAM 32, ROM 33, an HDD 34, an operation panel 35, an image reading unit 36, an image forming unit 37, and a communication I/F 38. Additionally, these units exchange data via a bus B.

The CPU 31 realizes the respective functions described below by loading various programs stored in the ROM 33 or elsewhere into the RAM 32 and executing the programs.

The RAM 32 is memory used as work memory for the CPU 31, for example. The ROM 33 is memory that stores information such as the various programs executed by the CPU 31. The HDD 34 is, for example, a magnetic disk device that stores information such as image data that has been scanned by the image reading unit 36 and image data used for image formation in the image forming unit 37. The operation panel 35 is, for example, a touch panel that displays various information and accepts operating input from a user.

The image reading unit 36 reads an image recorded onto an original document. Herein, the image reading unit 36 is a scanner, for example, and may be a charge-coupled device (CCD) scanner in which light from a light source is radiated onto a document and the reflected light therefrom is focused by a lens and sensed by a CCD, or a contact image sensor (CIS) scanner in which light from LED light sources is successively radiated onto a document and the reflected light therefrom is sensed by a CIS.

The image forming unit 37 is an example of a printing mechanism that forms an image onto the recording medium P. Herein, the image forming unit 37 is a printer, for example, and may be an electrophotographic system in which an image is formed by causing toner adhering to a photoconductor to be transferred to the recording medium P such as a paper sheet, or an inkjet printer in which an image is formed by ejecting ink onto the recording medium P. The communication I/F 38 transmits and receives various information to and from other devices via a network.

The image processing system 1 operates as follows, for example. In the image processing system 1, the computer device 10 performs color correction on an image to be displayed on the display screen 20a of the display device 20, and on an image to be formed on the recording medium P by the image forming device 30. Additionally, the color is made to match between the image displayed on the display screen 20a and the image formed on the recording medium P. As a result, the color of the printed matter printed by the image forming device 30 is matched to the color of the image displayed by the display device 20 (color matching), and differences in appearance may be reduced. This color correction is conducted using a conversion relationship. A conversion relationship is also called a profile, and may be created as a multidimensional lookup table (LUT), for example. However, the profile is not limited thereto. For example, the profile may also be a one-dimensional LUT. Additionally, the profile may also be a multidimensional matrix.

Also, in the image processing system 1 according to the present exemplary embodiment, the state before the color correction and the state after the color correction may be displayed for each of the image to be displayed on the display screen 20a of the display device 20 and the image to be formed on the recording medium P by the image forming device 30. Consequently, the user is able to confirm differences in the appearance of the images due to differences in the output destination, such as the display screen 20a and the recording medium P, the effect of the color correction, and the like.

Another issue to address is that the image printed on the recording medium P is susceptible to the effects of the lighting environment. For example, the image is affected by the color temperature of the lighting, and if the color temperature of the lighting is low, the image printed on the recording medium P may appear ruddy. For this reason, the state before color correction and the state after color correction may also be displayed respectively for the lighting environment. Consequently, the user is able to confirm differences in the appearance of the image due to differences in the lighting environment. This process is conducted by the computer device 10. Hereinafter, the computer device 10 that realizes the above process will be described.

<Description of Computer Device 10>

Figure 5:
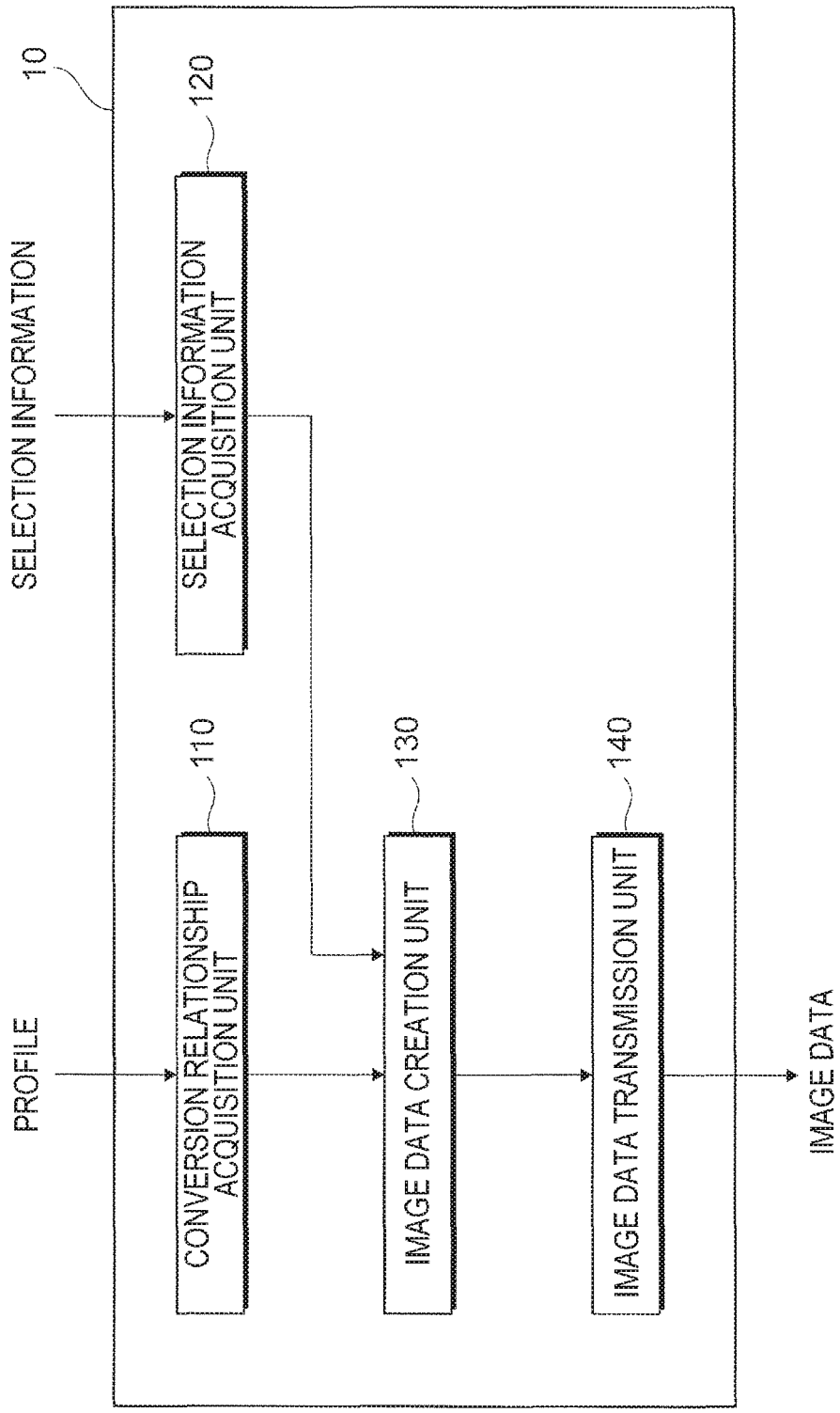
FIG. 5 is a block diagram illustrating an exemplary functional configuration of a computer device according to an exemplary embodiment.

FIG. 5 is a block diagram illustrating an exemplary functional configuration of the computer device 10 according to the present exemplary embodiment. The computer device 10 illustrated in the drawing is provided with a conversion relationship acquisition unit 110, a selection information acquisition unit 120, an image data creation unit 130, and an image data transmission unit 140.

The conversion relationship acquisition unit 110 acquires a conversion relationship (profile) for performing color correction, for each of multiple output destinations by which to output the image. In the present exemplary embodiment, the multiple output destinations are the display device 20 and the image forming device 30.

Also, in the present exemplary embodiment, the conversion relationship acquisition unit 110 additionally acquires a conversion relationship (profile) for performing color correction for the lighting environment. The lighting environment refers to the lighting environment in the location where the recording medium P is to be viewed, and is the color temperature of the lighting, for example. In this case, the profile is taken to correct the color to the state when the recording medium P is viewed under lighting having the color temperature of a reference light source (5000K). The lighting environment is also the illuminance of the lighting.

These profiles are prepared in advance and input into the computer device 10 by the user, for example. In addition, a profile may be acquired by selecting one from among multiple types of profiles prepared in advance.

The selection information acquisition unit 120 acquires, for each of the multiple output destinations, selection information about whether or not to perform color correction using a conversion relationship (profile). At this point, the selection information acquisition unit 120 acquires information about a selection result of whether or not to perform color correction with respect to the display device 20, and also whether or not to perform color correction with respect to the image forming device 30. Note that in the present exemplary embodiment, the selection information acquisition unit 120 additionally acquires selection information about whether or not to perform color correction for the lighting environment.

In the present exemplary embodiment, the user decides whether or not to perform color correction for each of the display device 20 and the image forming device 30. The user inputs the selection result via a device such as a keyboard device or a mouse device provided for the computer device 10. Subsequently, the selection information acquisition unit 120 acquires selection information as information about the selection result.

The image data creation unit 130 creates, for each of multiple output destinations, image data expressing the image before or after performing color correction on the basis of the acquired selection information. At this point, the image data creation unit 130 creates the image data by using the profile acquired by the conversion relationship acquisition unit 110. In the present exemplary embodiment, image data expressing the image before or after performing color correction based on the selection information is created for each of the display device 20 and the display device 20, and also for the lighting environment.

The image data transmission unit 140 transmits the image data created by the image data creation unit 130 to the display device 20.

<Description of Display Device 20>

In the display device 20, the image data transmitted by the image data transmission unit 140 is acquired by the interface unit 24. Note that in this case, the interface unit 24 may also be said to acquire image data expressing the image before or after performing color correction on the basis of selection information about whether or not to perform color correction for each of the multiple output destinations by which to output the image.

Also, in the display device 20, the image before or after performing color correction is displayed on the display unit 22 for each of the multiple output destinations, on the basis of the acquired image data.

Figure 6:
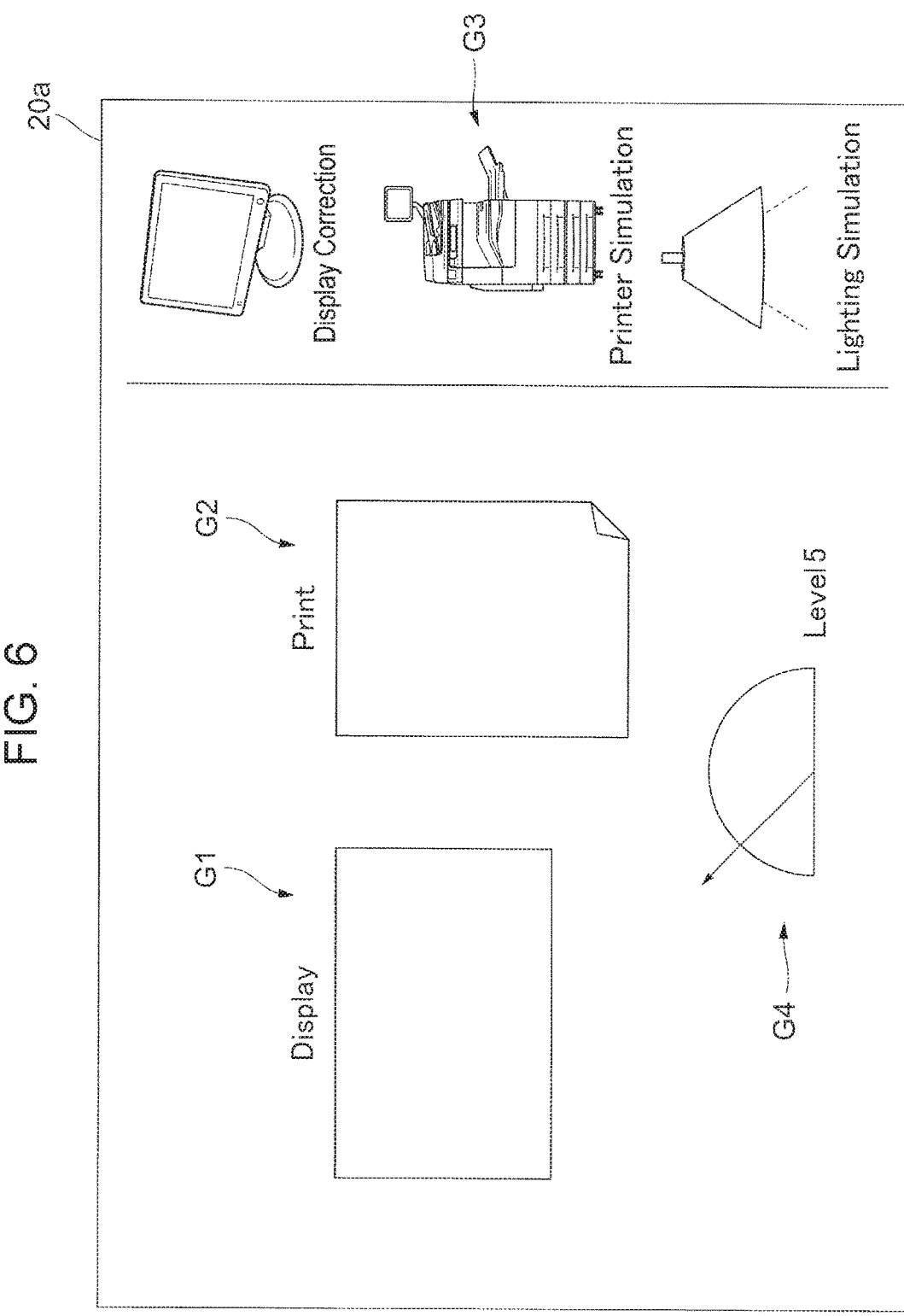
FIG. 6 illustrates a first example of an image displayed on a display screen of a display device.

FIG. 6 illustrates a first example of an image displayed on the display screen 20a of the display device 20 at this point. As illustrated in the drawing, on the display screen 20a are displayed an image G1 which is the image before or after performing color correction with respect to the display device 20 (labeled "Display" in the drawing), an image G2 which is the image before or after performing color correction with respect to the image forming device 30 (labeled "Print" in the drawing), icons G3 for inputting selection information about whether or not to perform color correction, and a level image G4 expressing the degree of color correction.

In FIG. 6, the images before or after performing color correction for each of the display device 20 and the image forming device 30 are displayed next to each other as the image G1 and the image G2. Also, as the icons G3, a "Display Correction" icon that selects whether or not to perform color correction with respect to the display device 20, a "Printer Simulation" icon that selects whether or not to perform color correction with respect to the image forming device 30, and a "Lighting Simulation" icon that selects whether or not to perform color correction for the lighting environment are displayed.

On this screen, the user may perform an operation on the icons G3 such as a click using a mouse device or the like, and is thereby able to select whether or not to perform color correction (that is, turn color correction on/off) with respect to the display device 20, the image forming device 30, and the lighting environment.

Subsequently, in accordance with the selection result, the computer device 10 creates and transmits to the display device 20 image data for displaying the image G1 and the image G2. In the display device 20, the image G1 and the image G2 are displayed on the display screen 20a, on the basis of the image data.

Note that the level image G4 is an image indicating the degree of color correction. For example, Level 1 may be taken to be the state in which color correction is not performed, and the numerical value of this level increases as the degree of color correction becomes larger. When the color correction is at maximum, the level reaches Level 5, for example. In other words, the degree of color correction is displayed in five stages. The degree of color correction may be decided on the basis of the selection information.

Consequently, by clicking the icons G3 with the mouse device or the like, the user is able to select whether or not to perform color correction with respect to each of the display device 20, the image forming device 30, and the lighting environment, and also confirm the effects of the color correction for each of the above.

Figure 7:
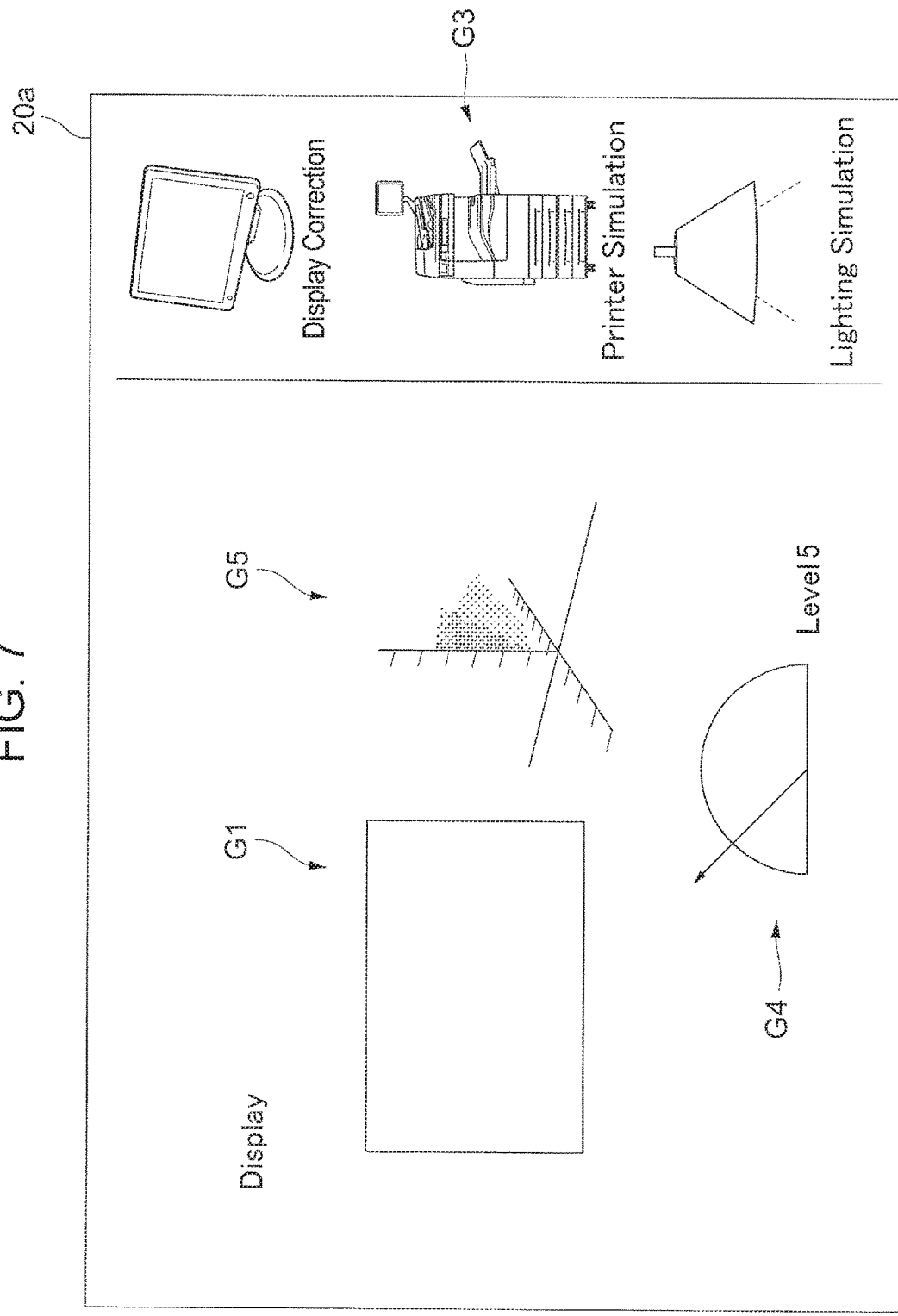
FIG. 7 illustrates a second example of an image displayed on a display screen of a display device.

FIG. 7 illustrates a second example of an image displayed on the display screen 20a of the display device 20. As illustrated in the drawing, compared to FIG. 6, the image G1 which is an the image before or after performing color correction with respect to the display device 20 (labeled "Display" in the drawing) is displayed, but the image G2 which is the image before or after performing color correction with reference to the image forming device 30 (labeled "Print" in the drawing) is not displayed. In addition, the way in which the color changes in the color space before and after the color correction due to the color correction selected from the icons G3 is displayed as a color space image G5. The colors plotted in the color space may be data from a model prepared in advance to indicate the change due to color conversion, for example, or may be the colors of the image data that is actually input. Additionally, to indicate the change due to color conversion, the plots before and after the color conversion may be plotted using different colors, or the display before and after the color conversion may be displayed with a time offset. The color space herein may be the L*a*b* color space, the RGB space, the CMYK space, or the like, for example.

Note that although a case of displaying the image G1 is illustrated herein, it is also possible to switch from the image G1 to the image G2 for display. In other words, in FIG. 7, the images before or after performing color correction are switched and displayed for each of the display device 20 and the image forming device 30.

Consequently, from the image G1 and the image G2, the user is able to confirm the effects of the color correction, and in addition, from the color space image G5, the user is able to confirm how the image data changes as a result of performing color correction.

<Description of Operations of Image Processing System 1>

Figure 8:
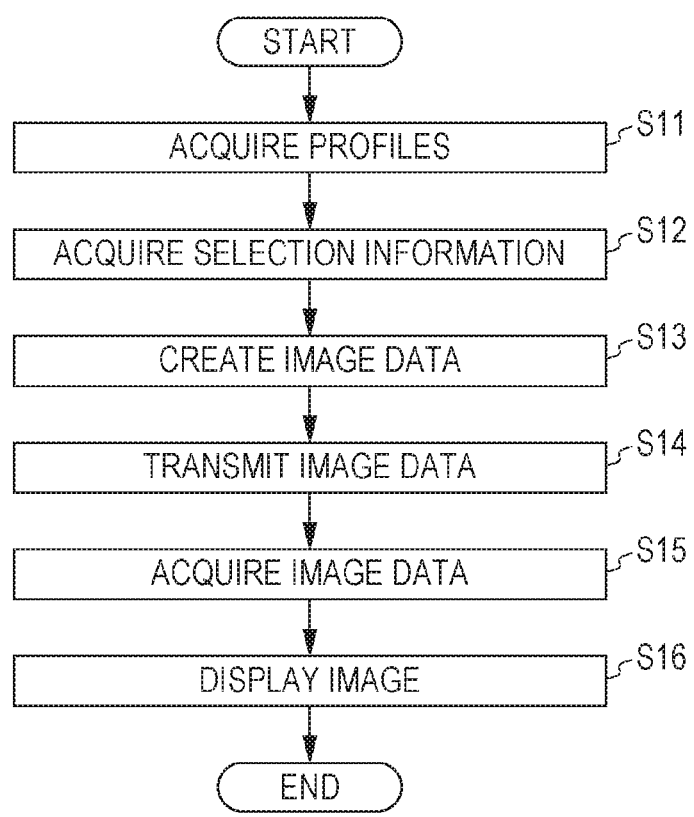
FIG. 8 is a flowchart describing operations of an image processing system.

FIG. 8 is a flowchart describing operations of the image processing system 1. First, the conversion relationship acquisition unit 110 acquires profiles by which to perform color correction with respect to the display device 20, the image forming device 30, and the lighting environment (step 11).

Next, the selection information acquisition unit 120 acquires selection information about whether or not to perform color correction for each of the display device 20, the image forming device 30, and the lighting environment (step 12).

Subsequently, the image data creation unit 130 creates image data expressing the image before or after performing color correction based on the selection information for each of the display device 20 and the display device 20, and also for the lighting environment (step 13). At this point, the image data creation unit 130 creates image data expressing the image before or after performing color correction by applying a profile acquired by the conversion relationship acquisition unit 110 to original image data that acts as a basis. The original image data used at this point is prepared in advance.

Next, the image data transmission unit 140 transmits the image data created by the image data creation unit 130 to the display device 20 (step 14).

Meanwhile, in the display device 20, the interface unit 24 acquires the image data transmitted by the image data transmission unit 140 (step 15).

Subsequently, the display unit 22, on the basis of the acquired image data, displays the image before or after performing color correction for each of the display device 20 and the image forming device 30 (step 16).

FIG. 9 is a diagram illustrating an example of combinations of selection information. The example illustrated in the drawing indicates a case in which the selection information is divided into five levels from No. 1 to No. 5 regarding whether or not to perform color correction for each of the display device 20, the image forming device 30, and the lighting environment. Herein, "ON" denotes that color correction is performed, while "OFF" denotes that color correction is not performed. Also, Level is an expression of the degree of correction according to the setting of the color correction selection for the display device 20, the image forming device 30, and the lighting environment, in which the degree of color correction is indicated in five stages from Level 1 to Level 5. Of these, No. 1 is the case of performing color correction with respect to all of the display device 20, the image forming device 30, and the lighting environment, and the degree of color correction is at the maximum Level 5. On the other hand, No. 5 is the case of not performing color correction with respect to any of the display device 20, the image forming device 30, and the lighting environment, and the degree of color correction is at the minimum Level 1. Meanwhile, No. 2 to No. 4 are the cases of performing color correction for one or two from among the display device 20, the image forming device 30, and the lighting environment, and the degree of color correction ranges from Level 2 to Level 4.

In this case, by comparing No. 1 and No. 2, for example, the difference between performing color correction (No. 1) and not performing color correction (No. 2) for the lighting environment may be viewed. As another example, by comparing No. 2 and No. 3, for example, the difference between performing color correction (No. 2) and not performing color correction (No. 3) for the image forming device 30 may be viewed. As yet another example, by comparing No. 1 and No. 4, for example, the difference between performing color correction (No. 1) and not performing color correction (No. 4) for the display device 20 may be viewed.

FIGS. 10A to 10E are flowcharts describing a method of creating image data for each of the cases from No. 1 to No. 5 in FIG. 9, respectively. Note that these flowcharts may be treated as being more detailed explanations of step 13 in FIG. 8.

Note that in the present exemplary embodiment, in the case of performing color correction with respect to the display device 20, the image data expressing the image G1 before performing color correction is image data to which the conversion relationship (profile) used for the display device 20 is not applied, whereas the image data expressing the image G1 after performing color correction is image data to which the conversion relationship (profile) used for the display device 20 is applied. In FIG. 9, when color correction for the display device 20 is ON, the profile is applied to the image G1, whereas when color correction for the display device 20 is OFF, the profile is not applied to the image G1.

On the other hand, in the present exemplary embodiment, in the case of performing color correction with respect to the image forming device 30, the image data expressing the image G2 before performing color correction is image data to which the conversion relationship (profile) used for the image forming device 30 is applied, whereas the image data expressing the image G2 after performing color correction is image data to which the conversion relationship (profile) used for the image forming device 30 is not applied. In other words, if the effects of the lighting environment are not considered, the image data of the image G1 is the same as the image data after performing color correction with respect to the image forming device 30, and if this image data is used as the image data of the image G2, the image G2 after performing color correction with respect to the image forming device 30 is displayed. In other words, the image data expressing the image G2 after performing color correction is image data to which the profile used for the image forming device 30 is not applied. Conversely, in the case of attempting to display the image G2 before performing color correction, the profile used for the image forming device 30 is applied to reproduce the state of non-matching color.

In FIG. 9, when color correction for the image forming device 30 is ON, the profile is not applied to the image G2, whereas when color correction for the image forming device 30 is OFF, the profile is applied to the image G2.

Similarly, in the present exemplary embodiment, in the case of performing color correction with respect to the lighting environment, the image data expressing the image before performing color correction with respect to the lighting environment is image data to which the conversion relationship (profile) used for the lighting environment is applied, whereas the image data expressing the image after performing color correction with respect to the lighting environment is image data to which the conversion relationship (profile) used for the lighting environment is not applied. In other words, if the effects of the color correction with respect to the image forming device 30 are not considered, the image data of the image G1 is the same as the image data after performing color correction with respect to the lighting environment, and if this image data is used as the image data of the image G2, the image G2 after performing color correction with respect to the lighting environment is displayed. In other words, the image data expressing the image G2 after performing color correction is image data to which the profile used for the lighting environment is not applied. Conversely, in the case of attempting to display the image G2 before performing color correction, the profile used for the lighting environment is applied to reproduce the state of non-matching color.

In FIG. 9, when color correction for the lighting environment is ON, the profile is not applied to the image G2, whereas when color correction for the lighting environment is OFF, the profile is applied to the image G2.

Figure 10A:
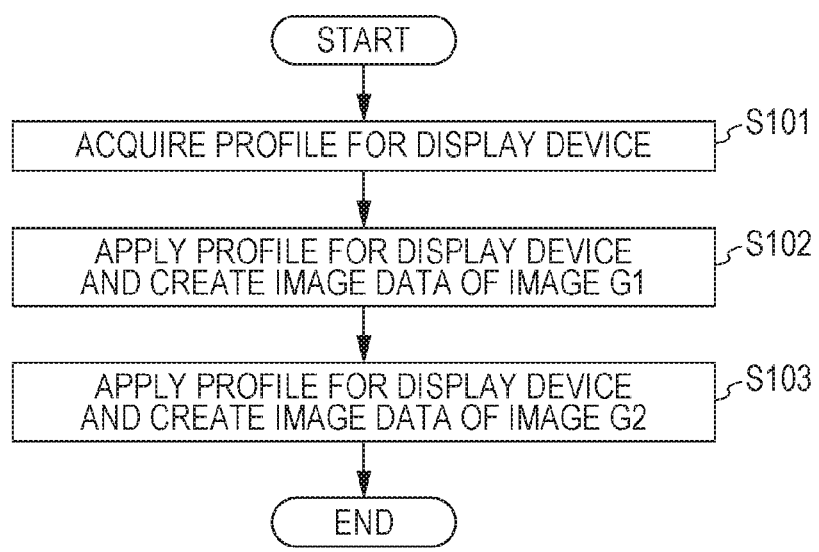

FIG. 10A illustrates a method of creating image data for the case of No. 1 in FIG. 9. As illustrated in FIG. 9, with No. 1, color correction is performed with respect to all of the display device 20, the image forming device 30, and the lighting environment.

First, the image data creation unit 130 acquires the profile used for the display device 20 (step 101). Subsequently, the image data creation unit 130 applies the profile used for the display device 20 to the original image data, and creates the image data of the image G1 (step 102). Additionally, the image data creation unit 130 applies the profile used for the display device 20 to the original image data, and creates the image data of the image G2 (step 103).

In other words, the image data of the image G1 and the image G2 are both the same. As a result, if color correction is performed with respect to all of the display device 20, the image forming device 30, and the lighting environment, the same image is displayed as the image G1 and the image G2.

Figure 10B:
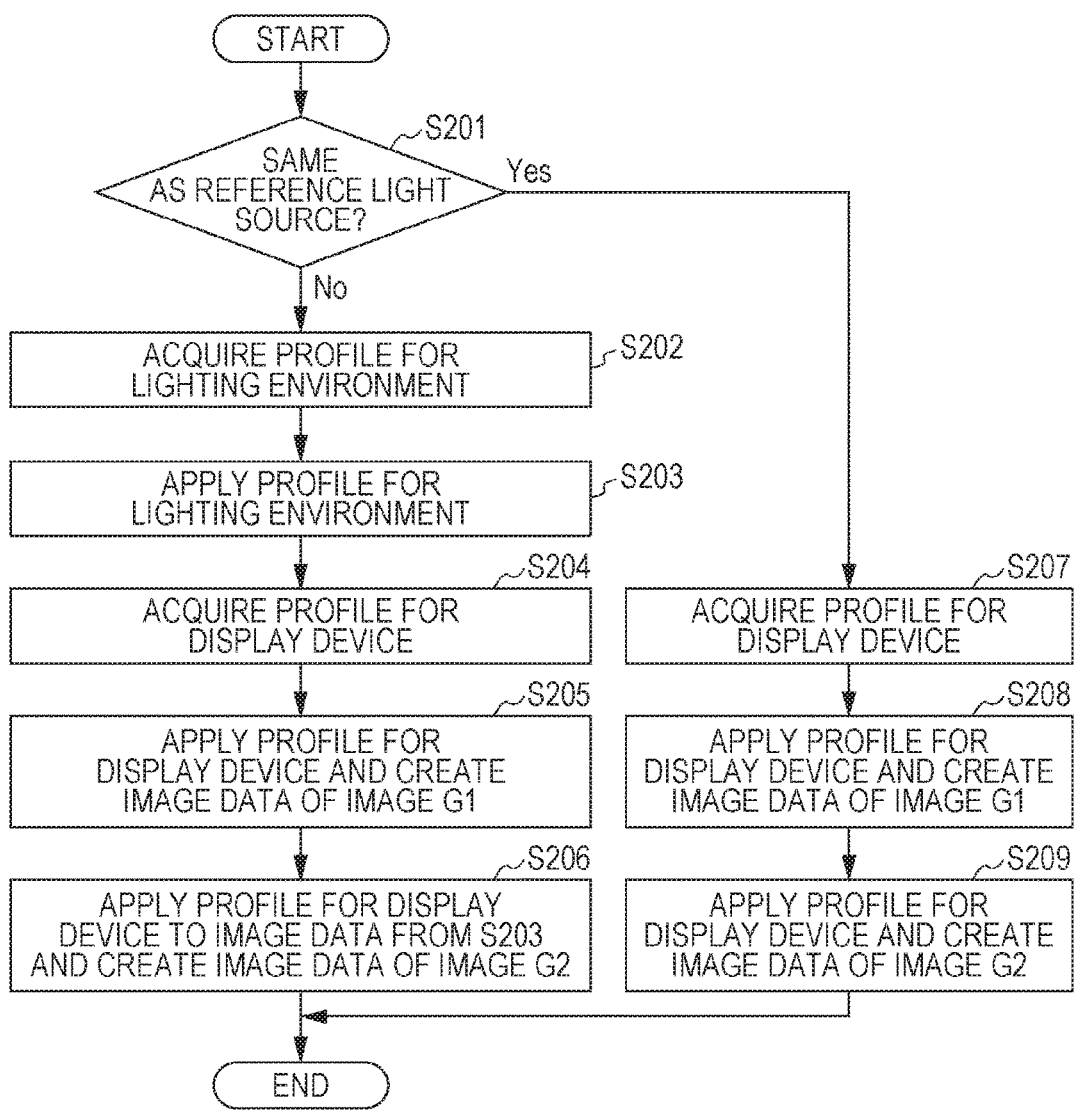

FIG. 10B illustrates a method of creating image data for the case of No. 2 in FIG. 9. As illustrated in FIG. 9, with No. 2, color correction is performed with respect to the display device 20 and the image forming device 30, but color correction is not performed with respect to the lighting environment.

First, the image data creation unit 130 determines whether or not the color temperature of the lighting environment is the same as the color temperature of a reference light source (step 201). Subsequently, if the color temperatures are difference (step 201, No), the image data creation unit 130 acquires the profile used for the lighting environment (step 202). Next, the image data creation unit 130 applies the profile used for the lighting environment to the original image data (step 203).

Additionally, the image data creation unit 130 acquires the profile used for the display device 20 (step 204). Subsequently, the image data creation unit 130 applies the profile used for the display device 20 to the original image data, and creates the image data of the image G1 (step 205). Additionally, the image data creation unit 130 applies the profile used for the display device 20 to the image data created in step 203, and creates the image data of the image G2 (step 206).

Note that in step 201, if the color temperatures are the same (step 201, Yes), the image data creation unit 130 acquires the profile used for the display device 20 (step 207). Subsequently, the image data creation unit 130 applies the profile used for the display device 20 to the original image data, and creates the image data of the image G1 (step 208). Additionally, the image data creation unit 130 applies the profile used for the display device 20, and creates the image data of the image G2 (step 209). In this case, the image data of the image G1 and the image G2 are both the same. In other words, the present case is similar to the case of FIG. 10A.

In other words, the image G2 reproduces an image of the recording medium P in a state in which color correction is not performed with respect to the lighting environment. Thus, in the image G2 for the display device 20, the effects of the lighting environment are not considered. This is because the recording medium P is viewed by the reflection of light from the lighting, and is thus susceptible to the effects of the lighting environment, but the display device 20 is self-luminous, and thus is less susceptible to the effects of the lighting environment. In this case, the image G1 and the image G2 respectively reproduce the images viewed when the display device 20 and the recording medium P are placed under the same lighting.

FIG. 10C illustrates a method of creating image data for the case of No. 3 in FIG. 9. As illustrated in FIG. 9, with No. 3, color correction is performed with respect to the display device 20, but color correction is not performed with respect to the image forming device 30 and the lighting environment.

First, the image data creation unit 130 acquires the profile used for the display device 20 and the profile used for the image forming device 30 (step 301). Next, the image data creation unit 130 applies the profile used for the image forming device 30 to the original image data (step 302). Subsequently, the image data creation unit 130 applies the profile used for the display device 20 to the original image data, and creates the image data of the image G1 (step 303). Additionally, the image data creation unit 130 applies the profile used for the display device 20 to the image data created in step 302, and creates the image data of the image G2 (step 304).

In other words, the image G2 reproduces an image of the recording medium P output in a state in which color correction is not performed with respect to the image forming device 30. In this case, in the image G1 and the image G2 respectively reproduce the images when color correction is performed with respect to the display device 20 but color correction is not performed with respect to the image forming device 30, with the display device 20 and the recording medium P placed under the same lighting.

Figure 10D:
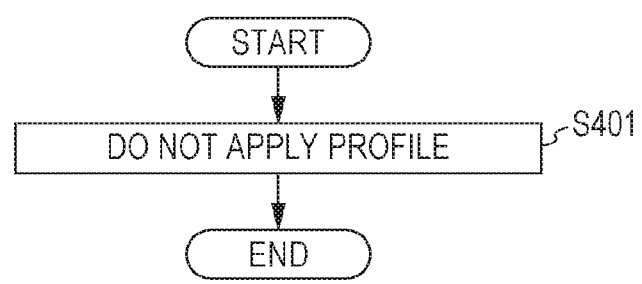

FIG. 10D illustrates a method of creating image data for the case of No. 4 in FIG. 9. As illustrated in FIG. 9, with No. 4, color correction is not performed with respect to the display device 20, but color correction is performed with respect to the image forming device 30 and the lighting environment. In this case, the image data creation unit 130 does not apply a profile, and treats the image data of the original image directly as the image data of the image G1 and the image G2 (step 401). In other words, the image data of the image G1 and the image G2 are both the same. As a result, the same image is displayed as the image G1 and the image G2.

Figure 10E:
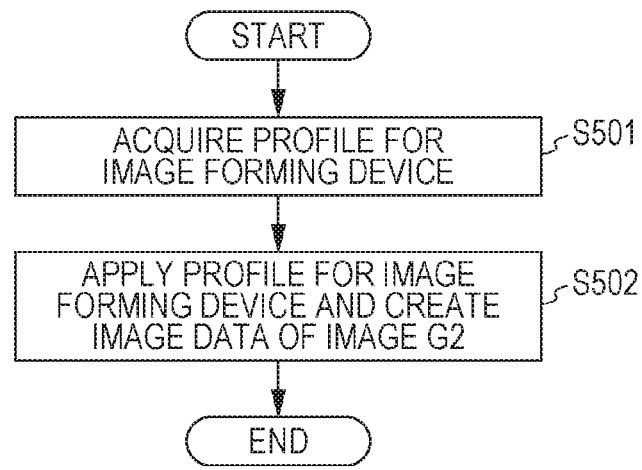

FIG. 10E illustrates a method of creating image data for the case of No. 5 in FIG. 9. As illustrated in FIG. 9, with No. 5, color correction is not performed with respect to any of the display device 20, the image forming device 30, and the lighting environment.

First, the image data creation unit 130 acquires the profile used for the image forming device 30 (step 501). Next, the image data creation unit 130 applies the profile used for the image forming device 30 to the original image data to create the image data of the image G2 (step 502). Note that the image data of the image G1 is the same as the original image data.

According to the image processing system 1 described above, the effects of performing and not performing color correction with respect to the display device 20, the image forming device 30, and the lighting environment may be confirmed easily. Differences in the appearance of an image due to differences between the display device 20 and the image forming device 30, the effects of the color correction, and the like may be presented to the user in an easily understood manner. In addition, the print result may be confirmed without actually printing with the image forming device 30, and the amount of the recording medium P used may be reduced. Furthermore, even if the image forming device 30 is in a remote location, the output result of an image may be confirmed easily, thereby reducing inexpediences such as creating and mailing printed material.

Note that the image processing method described above may also be treated as an image processing method including: a conversion relationship acquisition step that acquires a conversion relationship (profile) for performing color correction with respect to each of multiple output destinations by which to output an image; a selection information acquisition step that acquires selection information about whether or not to perform color correction using the conversion relationship (profile) with respect to each of the multiple output destinations; and an image data transmission step that transmits, to a display device, image data expressing the image before or after performing color correction on the basis of the acquired selection information for each of the multiple output destinations.

In addition, in the example described above, the display device to which the profile is applied and the display device that displays the images G1 and G2 illustrated in FIGS. 6 and 7 are taken to be the same display device 20, but may also be different display devices.

Furthermore, in the example described above, the case of performing color correction with respect to the display device 20, the image forming device 30, and the lighting environment is described, but color correction that additionally includes the characteristics of the recording medium P used by the image forming device 30 may also be performed. In this case, color correction may be performed by adjusting the color temperature of the display device 20. For example, in the case of a recording medium P with a yellowish tint, the color temperature of the display device 20 may be lowered. On the other hand, in the case of a recording medium P with a bluish tint, the color temperature of the display device 20 may be raised.

Also, in the foregoing example, the images G1 and G2 illustrated in FIGS. 6 and 7 are the images before or after performing color correction, but the images to display are not limited thereto. For example, besides image data expressing an image before or after performing color correction with the computer device 10, image data expressing intermediate images before and after performing color correction may be created. By subsequently transmitting this image data to the display device 20, intermediate images before and after performing color correction may be displayed on the display device 20.

Also, the foregoing example describes a case in which the computer device 10 performs color correction with respect to the display device 20, the image forming device 30, and the lighting environment, or in other words, a case in which a so-called software correction is applied, but a so-called hardware correction using a color correction device or the like may also be applied.

<Description of Program>

The processing performed by the computer device 10 according to the present exemplary embodiment described in the foregoing is prepared as a program, such as application software, for example.

Thus, the processing conducted by the computer device 10 according to the present exemplary embodiment may also be treated as a program causing a computer to realize: a conversion relationship acquisition function that acquires a conversion relationship (profile) for performing color correction with respect to each of multiple output destinations by which to output an image; a selection information acquisition function that acquires selection information about whether or not to perform color correction using the conversion relationship (profile) with respect to each of the multiple output destinations; and an image data transmission function that transmits, to a display device, image data expressing the image before or after performing color correction on the basis of the acquired selection information for each of the multiple output destinations.

Note that a program realizing an exemplary embodiment obviously may be provided via a communication medium, and may also be provided by being stored on a recording medium such as CD-ROM.

The foregoing thus describes an exemplary embodiment of the present exemplary embodiment, but the technical scope of the present invention is not limited to the scope described in the foregoing exemplary embodiment. It is clear from the claims that a variety of modifications or alterations to the foregoing exemplary embodiment are also included in the technical scope of the present invention.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing device, comprising:
a processor configured to execute:
 a conversion relationship acquisition unit that acquires a first conversion relationship for performing color correction corresponding to a display device and a second conversion relationship for performing color correction corresponding to an image forming device;
 a selection information acquisition unit that acquires first selection information about whether or not to perform color correction using the first conversion relationship and acquires second selection information about whether or not to perform color correction using the second conversion relationship; and
 an image data transmission unit that transmits, to the display device, first image data expressing the image before or after performing color correction on a basis of the first selection information and second image data expressing the image before or after performing color correction on a basis of the second selection information,
wherein in response to the second selection information indicating that color correction is not to be performed, the second image data is transmitted after performing color correction using the second conversion relationship.

2. The image processing device according to claim 1, wherein
in a case of performing color correction with respect to the display device, the first image data expressing the image before performing color correction is image data to which the first conversion relationship used for the display device is not applied, whereas the first image data expressing the image after performing color correction is image data to which the first conversion relationship used for the display device is applied.

3. The image processing device according to claim 1, wherein
in a case of performing color correction with respect to the image forming device, the second image data expressing the image before performing color correction is image data to which the second conversion relationship used for the image forming device is applied, whereas the second image data expressing the image after performing color correction is image data to which the second conversion relationship used for the image forming device is not applied.

4. The image processing device according to claim 1, wherein
color correction that additionally includes characteristics of a recording medium used by the image forming device is performed.

5. The image processing device according to claim 1, wherein
the conversion relationship acquisition unit additionally acquires a third conversion relationship for performing color correction with respect to a lighting environment, and
the selection information acquisition unit additionally acquires third selection information about whether or not to perform color correction with respect to the lighting environment.

6. The image processing device according to claim 5, wherein
in a case of performing color correction with respect to the lighting environment, third image data expressing the image before performing color correction with respect to the lighting environment is image data to which the third conversion relationship used for the lighting environment is applied, whereas the third image data expressing the image after performing color correction with respect to the lighting environment is image data to which the third conversion relationship used for the lighting environment is not applied.

7. The image processing device according to claim 1, wherein
the image data transmission unit transmits, to the display device, image data expressing intermediate images before and after performing color correction, in addition to the first and second image data expressing the image before or after performing color correction.

8. A display device comprising:
a processor configured to acquire, on a basis of first selection information about whether or not to perform color correction with respect to the display device and second selection information about whether or not to perform color correction with respect to an image forming device, first image data expressing an image before or after performing color correction corresponding to the display device and second image data expressing an image before or after performing color correction corresponding to the image forming device; and
a display that displays a first image before or after performing color correction, on a basis of the acquired first image data, and a second image before or after performing color correction, on a basis of the acquired second image data,
wherein in response to the second selection information indicating that color correction is not to be performed with respect to the image forming device, the second image is displayed after performing color correction with respect to the image forming device.

9. The display device according to claim 8, wherein
the display displays the first image and the second image adjacent to each other.

10. The display device according to claim 8, wherein
the display displays the first image and the second image by switching from one image to another.

11. The display device according to claim 8, wherein
in response to the first image being displayed, the display displays an image expressing a degree of color correction on a basis of the first selection information.

12. A non-transitory computer-readable medium storing a program causing a computer to execute a process for processing an image, the process comprising:
acquiring a first conversion relationship for performing color correction corresponding to a display device and a second conversion relationship for performing color correction corresponding to an image forming device;
acquiring first selection information about whether or not to perform color correction using the first conversion relationship and second selection information about whether or not to perform color correction using the second conversion relationship; and
transmitting, to the display device, first image data expressing the image before or after performing color correction on a basis of the first selection information and second image data expressing the image before or after performing color correction on a basis of the second selection information,
wherein in response to the second selection information indicating that color correction is not to be performed using the second conversion relationship, the second image data is transmitted after performing color correction using the second conversion relationship.

13. The image processing device according to claim 1, wherein in response to the first selection information indicating that color correction is to be performed using the first conversion relationship and the second selection information indicating that color correction is to be performed using the second conversion relationship, the first image data is transmitted after performing color correction using the first conversion relationship and the second image data is transmitted after performing color correction using the first conversion relationship without color correction being performed using the second conversion relationship.

* * * * *